United States Patent [19]

Hall

[11] Patent Number: 5,172,713
[45] Date of Patent: Dec. 22, 1992

[54] MODULAR MIXING VALVE

[75] Inventor: James A. Hall, Bartlett, Ill.

[73] Assignee: Eaton Corporation, Cleveland, Ohio

[21] Appl. No.: 864,292

[22] Filed: Apr. 6, 1992

[51] Int. Cl.$^5$ ............... F16K 27/00; F16K 11/24
[52] U.S. Cl. .................... 137/15; 137/606; 251/38; 251/367
[58] Field of Search ........... 137/606, 607, 884, 15; 251/38, 367, 129.04, 129.17

[56] References Cited

U.S. PATENT DOCUMENTS

| | | | |
|---|---|---|---|
| 3,094,139 | 6/1963 | Budde et al. | 251/367 X |
| 3,638,680 | 2/1972 | Kopp | 137/606 X |
| 3,714,958 | 2/1973 | Johnson et al. | 137/606 X |
| 3,743,240 | 7/1973 | Merriner et al. | 251/129.17 |
| 4,290,450 | 9/1981 | Swanson | 137/606 |
| 4,441,521 | 4/1984 | Brown et al. | 251/38 X |
| 4,830,055 | 5/1989 | Kolibas | 137/884 |
| 4,944,487 | 7/1990 | Holtermann | 251/129.17 |

*Primary Examiner*—Stephen M. Hepperle
*Attorney, Agent, or Firm*—R. A. Johnston

[57] ABSTRACT

An electrically operated plural inlet-single outlet plastic mixing valve having common dual valve operator assemblies separately supplying valve flow to an outlet manifold to which the operator assemblies are attached by non-metallic weldment. In one embodiment the manifold has plural inlets oppositely connected to a common outlet such that the valve operators are oppositely disposed. The inlets may be rotationally oriented as desired at weldment with respect to each other and the manifold outlet. In a second embodiment the valve operators are disposed in spaced aligned arrangement.

10 Claims, 2 Drawing Sheets

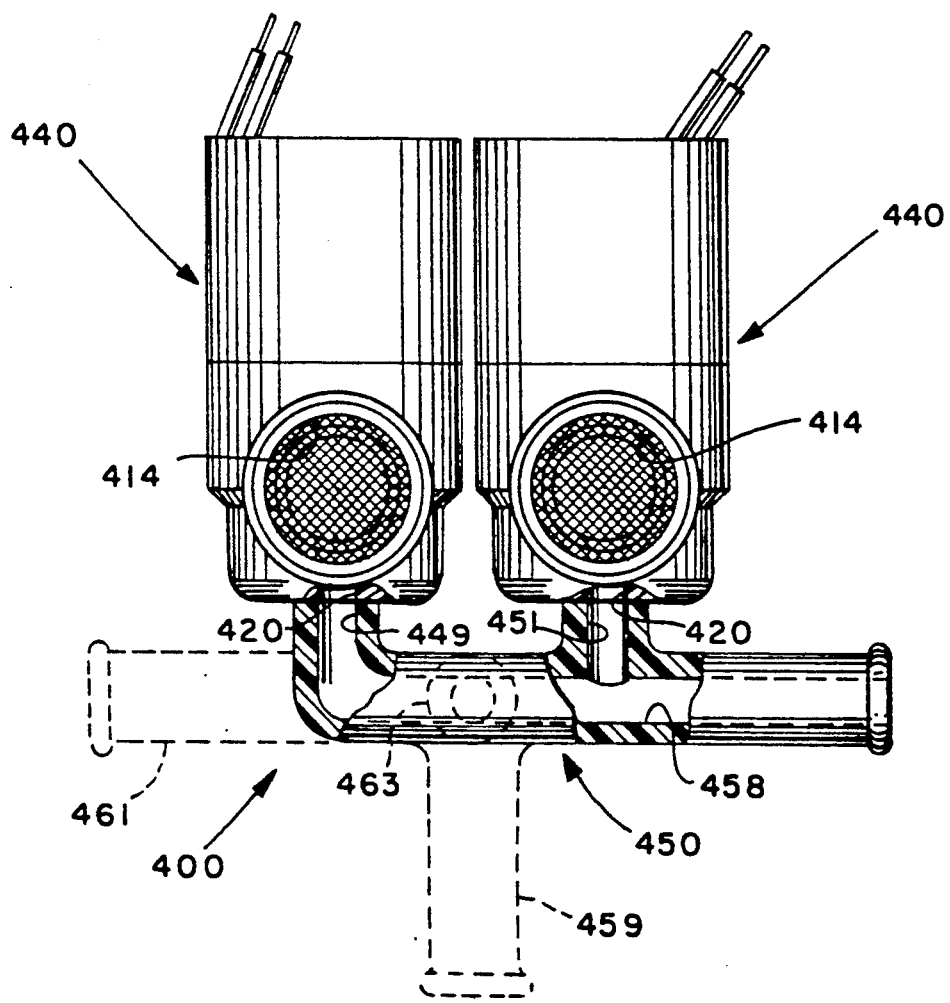

MODULAR MIXING VALVE

BACKGROUND OF THE INVENTION

The present invention relates to plural inlet-single outlet mixing valves and particularly such valves which are electrically operated as, for example, by an electromagnetic operator such as a solenoid. Solenoid operated mixing valves are commonly employed as water inlet valves for appliances such as washing machines where it is desired to provide a mixture of hot and cold water from separate sources to provide a tempered water for use in the washing program of the appliance.

Typically, solenoid operated water mixing valves for washing machines are of the pilot operated type in which the solenoid moves an armature to open a small pilot chamber, the flow from which creates a pressure differential across a main valve member, which differential moves the main valve to the open position, enabling full flow through the valve. Pilot operated solenoid actuated mixing valves for appliances are commonly formed with the valve body made of plastic material corrosion resistance, light weight, and low manufacturing cost in high volume production by virtue of being injection molded.

However, where it is desired to have such a valve with plural inlets and a single outlet, and to provide variations in the orientation and arrangement of the inlets, both with respect to each other and with respect to the outlet, it has required costly mold redesigns to provide such variations. It is often necessary to vary the arrangement of the valve inlets with respect to the outlet to facilitate mounting of the valve in the appliance and for enabling convenient connection thereto of the water source and the outlet to the washing receptacle in the appliance.

Accordingly, it has been desired to find a way or means of designing and manufacturing an appliance water inlet mixing valve such that the valve operating mechanism may remain unchanged but the orientation or relationship of the plural inlets with respect to each other and with respect to the outlet may be changed to meet different mounting requirements without requiring costly tooling changes, such as new molds.

SUMMARY OF THE INVENTION

The present invention provides a unique modular construction for a plastic bodied appliance mixing valve of the solenoid operated type having plural inlets and a single outlet. The valve construction employs a solenoid operator including a coil potted in place within a plastic cupped cavity on the body. The body with the valve operating elements and coil potted therein is then fusion welded to a symmetric outlet manifold which forms the outlet for the plural valve operators. The manifold may be oriented in any rotational position with respect to the valve inlets; and, the valve outlets may similarly be either aligned or rotated with respect to each other at the time of the fusion weldment. In one embodiment, the potted coils are disposed in aligned opposite directions for compactness and ease of mounting of the valve in the appliance. In another embodiment the potted coils are in closely spaced parallel arrangement.

DETAILED DESCRIPTION

Figure 1:
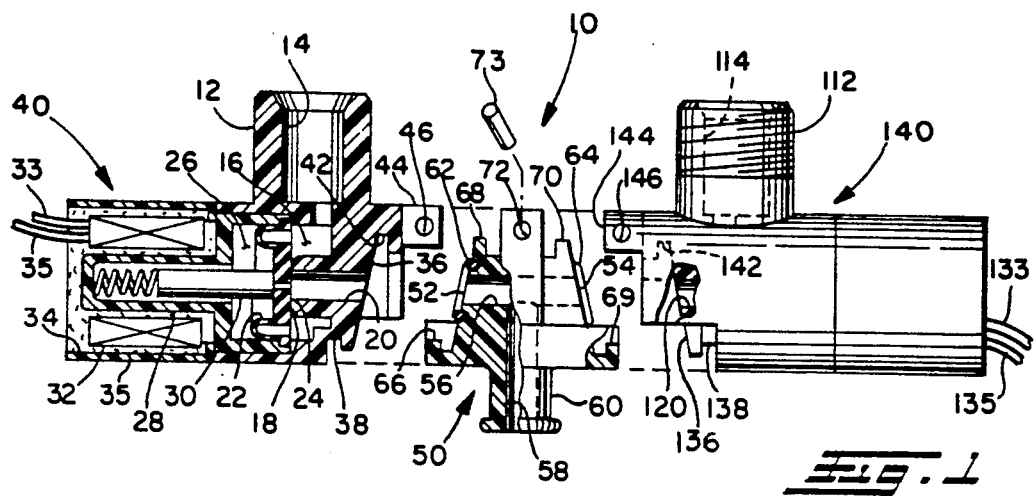
FIG. 1 is an exploded view of an embodiment of the invention wherein the outlet manifold and valve operator bodies are secured together by a pinned connection.

Referring to FIG. 1, a first embodiment of the invention is indicated generally at 10 and includes a first plastic valve body 12 having an inlet 14 and valving chamber 16 and having a valve seat 18 communicating with an outlet passage 20. A pressure responsive diaphragm 22 has the central portion thereof formed as a main valve member for seating against valve seat 18. A pilot valve passage 24 is formed through the center of the valve member. A pilot valving chamber 26 is formed on the side of the diaphragm opposite the valve seat 18; and, a guide member 28 is received over the diaphragm and seals it in the body 12, forming the pilot valve chamber 26. Guide 28 has slidably received therein a spring biased armature 30 which forms a pilot valve member for closing the pilot passage 24.

A solenoid coil 32 is potted in a cavity 34 formed in a cupped plastic member 35 attached to body 12, preferably by fusion weldment. It will be understood that the pilot valve chamber is typically supplied by a small bleed orifice (not shown) provided either through the diaphragm or through the wall of the guide member 28, the bleed orifice being omitted from the drawings for the sake of brevity of illustration, but is well known in the art and is necessary for replenishment of the pilot chamber 26 and proper operation of a pilot operated valve. It will be further understood that the unshown bleed orifice must be smaller than the pilot outlet orifice 24 for proper valve operation. It will be further understood that although a pilot operated valve construction is shown in the drawings, that the invention is applicable to direct acting valves and a pilot operator is not necessary for the practice of the invention.

The assembled valve body 12 with internal valve components and the coil 32 and cup 34 are denoted generally at 40 as comprising a valve operator assembly.

The valve body 12 has an inclined surface 36 surrounding the outlet passage 20 and a pair of grooves 38,42 formed on opposite sides of surface 36. A lug 44 extends outwardly from the body with an aperture 46 provided therein and adapted for attachment thereto as will hereinafter be described.

A symmetrically opposite valve operator assembly indicated generally at 140 is provided and has the plastic body 112 and an inclined surface 136 surrounding the outlet 120 similar to the inclined surface 36 of the assembly 40. The valve operator assembly 140 has grooves 138,142 provided on opposite sides of the outlet in a manner similar to that of the valve operator assembly 40; and, the operator assembly 140 also has a lug 144 extending therefrom and an aperture 146 provided therein and adapted for attachment thereto, as will hereinafter be described. It will be understood that the operator 140 is in all operational aspects identical to the operator assembly 40.

An outlet manifold indicated generally at 50 is also formed of plastic and has an inclined surface 52 provided on the left side thereof, which surface is adapted for mating with inclined surface 36 on the valve body 12. Similarly, the manifold 50 has an oppositely disposed inclined surface 54 provided on the opposite side thereof and configured for mating with the surface 136 on the valve body 112. Inclined surfaces 52,54 are interconnected by a continuous manifold inlet passage 56 which intersects an outlet passage 58 which extends generally at right angles thereto and outwardly through connecting boss 60 provided on the manifold 50.

A resilient seal ring 62 is provided around passage 56 on inclined face 52 of the manifold. Similarly, a resilient seal ring 64 is provided around the outlet passage 56 on inclined face 54. Ring 62 is adapted for sealing against the inclined 36; whereas, resilient seal ring 64 is adapted for sealing against inclined surface 136 of valve body 112.

Manifold 50 as shown has on the left side thereof in FIG. 1 a land 66 which is figured to be slidingly received in groove 38; and, a second land 68 is provided on the opposite side of passage 56 at the edge of inclined surface 52. Land 68 is configured to be slidably received in groove 42 in the body 12.

Similarly, a land 70 is formed at the edge of inclined surface 54 on the manifold, which land 70 is configured to be slidably received in the groove 142 in body 112. An additional land 69 is provided on manifold 50 for sliding into groove 138 in body 112. With the manifold lands 66,68 slidably received in the respective 38,42 grooves and on the body 12 and lands 68,70 are slidably received in grooves 138,142. With the bodies 12,112 assembled land-to-groove on the manifold 50, the pin 73 is received in an aperture 74 provided in the manifold and also passes through apertures 46 and 146, thereby locking the manifold to the operator assemblies 40,140.

Figure 2:
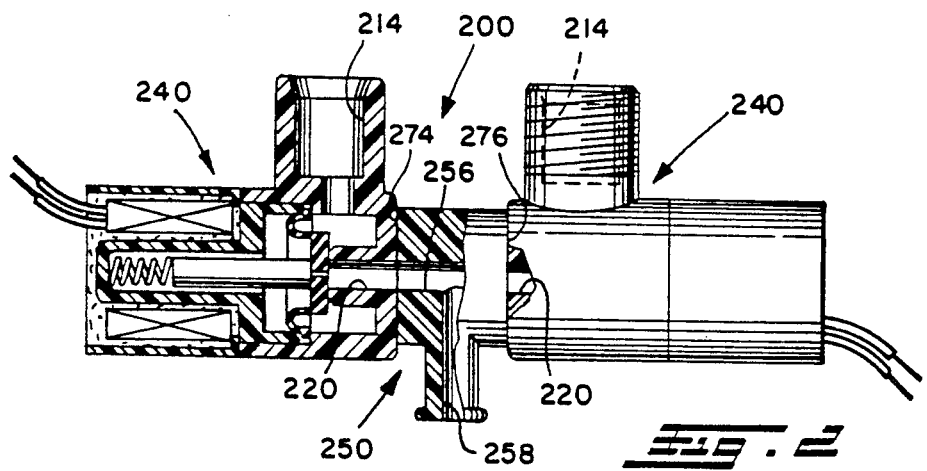
FIG. 2 is a view similar to FIG. 1 of an assembled valve secured together by fusion weldment.

Referring to FIG. 2, a second embodiment, denoted generally at 200 is illustrated wherein a pair of identical plastic valve operator assemblies 240 are assembled to a manifold indicated generally at 250 and also formed of plastic. The valve operator assemblies 240,340 are joined to a symmetric plastic outlet manifold indicated generally at 250 on opposite sides thereof and which has an inlet passage 256 which passes therethrough and communicates with inlet passage 220 of the operator assembly 240 and at each end thereof. The manifold passage 256 communicates with single outlet passage 258. Manifold 250 has oppositely disposed parallel sides 274,276 which are joined to respectively matching surfaces on each of the operator assemblies 240,340, by non-metallic fusion weldment such as by vibration or ultrasonic treatment. The modular construction of the embodiment 200 of FIG. 2 thus permits the outlet 258 of the manifold to be rotated to any desirable rotational position with respect to the inlets of the operator assemblies 240; and, the inlets may be similarly oriented rotationally in any desired position with respect to each other.

Figure 3:
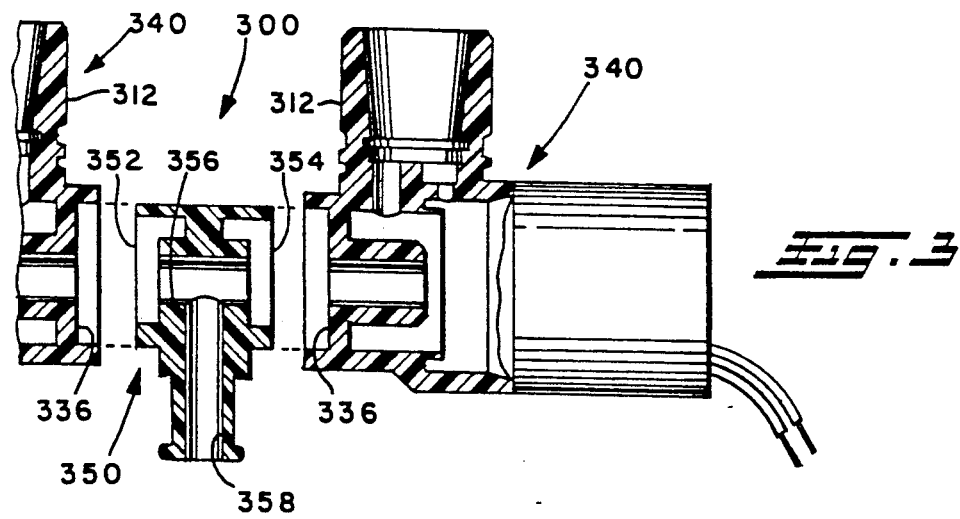
FIG. 3 is an exploded view of an alternate embodiment of the valve of FIG. 2 and, FIG. 4 is a side view with portions broken array of another embodiment of the invention.

Referring to FIG. 3, an alternate embodiment, indicated generally at 400, of the present invention is illustrated wherein the pair of identical plastic valve operator bodies 312 are attached to opposite sides of a symmetric plastic outlet manifold having an inlet passage 356 continuously therethrough with opposite sides or faces 352,354 thereof received respectively in a recess 336 in the bodies 312. The attachment of the bodies 312 to the manifold 350 is preferably accomplished by non-metallic fusion weldment as, for example, by spin welding, vibration welding, or ultrasonic welding.

Referring to FIG. 4, another embodiment of a mixing valve assembly is indicated generally at 400 as having a pair of identical plastic valve operator assemblies indicated generally at 440, each having an inlet 414 provided with a filter screen and an outlet passage 420. The pair of valve operator assemblies 440 are disposed in closely spaced parallel arrangement with the outlet thereof generally parallel. A plastic outlet indicated generally at 450 has spaced parallel inlet passages 449,451 which communicate with a common outlet passage 558 provided in the manifold generally at right angles to the inlets and which is illustrated in solid outline and extends rightwardly in FIG. 4. It will be understood, however, that the outlet passage 458 may alternatively be oriented either leftward or perpendicular to the plane of the drawing or downwardly as desired; and, each of these alternate directions of orientation is indicated in dashed outline in FIG. 4 and denoted by reference numerals 459,461,463. The inlet passage 449,451 are attached to communicate with the valve operator outlet passages 420 by non-metallic weldment as, for example, by spin, vibration or ultrasonic techniques.

The present invention thus provides an easy to manufacture low cost electrically operated plastic mixing valve assembly having plural inlets and a common outlet with individual valves for each inlet electrically operated. The construction of the mixing valve of the present invention readily permits a wide variety of orientations of the inlets with respect to the outlet or with respect to each other at final assembly comprising non-metallic weldment of the valve operator body assemblies the common outlet manifold.

Although the invention has hereinabove been described with respect to the illustrated embodiments, it will be understood to those of ordinary in the art that the invention is capable of modifications and variations, and is limited only by the scope of the following claims.

I claim:

1. An electrically energizable modular valve assembly comprising:
   (a) a plurality of valve bodies each formed of non-metallic material having a fluid inlet port adapted for connection to a supply of pressurized fluid and an outlet port and a valving chamber communicating with said ports and having a valve seat formed therein such that flow thereover is discharged to said outlet port;
   (b) a valve member disposed in said chamber in each of said bodies for movement between a position preventing and a position permitting flow over said valve seat;
   (c) cover means closing and sealing said valving chamber on each of said bodies and retaining said valve member therein, said cover means defining an open cavity on the exterior thereof and secured to said body by non-metallic weldment to form a valve sub-assembly;
   (d) an electrical coil potted in said open cavity in each of said cover means and operable upon energization and de-energization to effect movement of said valve member between said positions permitting and preventing flow; and,
   (e) a manifold formed of non-metallic material having plural inlets communicating with a single outlet with each of said inlets attached to the outlet port of one of said valve sub-assemblies in a fluid pressure sealing arrangement.

2. The valve assembly defined in claim 1, wherein said manifold has said inlets disposed in spaced parallel relationship.

3. The valve assembly defined in claim 1, wherein said manifold has said inlets disposed in oppositely directed aligned arrangement and said outlet disposed therebetween at generally right angles to said alignment.

4. The valve assembly defined in claim 1, wherein said manifold inlets and said valve body outlet ports have circular configurations permitting unlimited rotational orientation of said body on said manifold for said weldment.

5. The valve assembly defined in claim 1, wherein said valve body has said fluid inlet port disposed at generally right angles to said outlet port.

6. The valve assembly defined in claim 1, wherein said manifold is attached to said valve sub-assemblies by non-metallic weldment.

7. The valve assembly defined in claim 1, wherein said manifold has an annular resilient seal engaging the outlet port of each of said valve sub-assemblies.

8. The valve assembly defined in claim 1, wherein said manifold is secured to all of said valve sub-assemblies by a common pin means.

9. A method of making a valve having a plural inlet and a single outlet comprising the steps of:
   (a) providing a plurality of valve bodies having an inlet and an outlet communicating with a valving cavity and valve seat disposed in said cavity between the inlet and outlet;
   (b) disposing a movable valve member in said cavity adjacent said valve seat and closing said cavity and securing a cupped cover thereover by non-metallic weldment;
   (c) potting an electrical coil in said cupped cover providing a manifold having plural inlets
   (d) providing a manifold having plural inlets supplying a single outlet; and,
   (e) connecting and sealing the outlet of one of a plurality of said valve sub-assemblies to each of said manifold inlets and securing said connection by non-metallic weldment.

10. The method defined in claim 6, wherein said step of connecting said sub-assemblies to said manifold includes the step of orienting each of said inlets in a desired position with respect to said outlet.

* * * * *